United States Patent
Chen et al.

(10) Patent No.: US 10,944,483 B2
(45) Date of Patent: Mar. 9, 2021

(54) REFLECTION-TYPE COHERENT OPTICAL COMMUNICATION SYSTEM COMBINED WITH UNIDIRECTIONAL OPTICAL SIGNAL AMPLIFICATION

(71) Applicant: University of Electronic Science and Technology of China, Chengdu (CN)

(72) Inventors: Shuqiang Chen, Chengdu (CN); Shiwen Jin, Chengdu (CN); Yuanyuan Jiang, Chengdu (CN); Miao Yan, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 16/925,340

(22) Filed: Jul. 10, 2020

(65) Prior Publication Data
US 2021/0013972 A1    Jan. 14, 2021

(30) Foreign Application Priority Data
Jul. 10, 2019   (CN) .......................... 201910619987.8

(51) Int. Cl.
*H04B 10/00*   (2013.01)
*H04B 10/61*   (2013.01)
*H04J 14/00*   (2006.01)

(52) U.S. Cl.
CPC ......... *H04B 10/614* (2013.01); *H04B 10/612* (2013.01); *H04B 10/6151* (2013.01)

(58) Field of Classification Search
None
See application file for complete search history.

(56) References Cited

U.S. PATENT DOCUMENTS

| | | | |
|---|---|---|---|
| 10,302,867 B1* | 5/2019 | Goutzoulis | G02B 6/4216 |
| 2007/0058978 A1* | 3/2007 | Lee | H04W 4/18 |
| | | | 398/115 |

* cited by examiner

*Primary Examiner* — Daniel G Dobson
(74) *Attorney, Agent, or Firm* — Bayramoglu Law Offices LLC

(57) ABSTRACT

A reflection-type coherent optical communication system combined with unidirectional optical signal amplification, comprises a polarization controller, a polarization beam splitter, a polarization maintaining optical circulator, an In-line polarizer, an optical modulator, a photoelectric converter, an electrical comparator, an optical amplifier, a laser, a coupler, a reflection end and a coherent receiver. A light source is disposed at a receiving end, and the laser emits an optical carrier. The optical carrier is transmitted through the coupler and an optical fiber. Thereafter, the polarization state of the optical carrier is controlled by two ways, the optical carrier passes through the polarization controller in a first way, and two beams of light are output by the polarization beam splitter. A beam of light with high-power is modulated through a first branch, and the modulation signal is returned along an original optical path.

5 Claims, 2 Drawing Sheets

REFLECTION-TYPE COHERENT OPTICAL COMMUNICATION SYSTEM COMBINED WITH UNIDIRECTIONAL OPTICAL SIGNAL AMPLIFICATION

CROSS REFERENCE TO THE RELATED APPLICATIONS

This application is based upon and claims priority to Chinese Patent Application No. 201910619987.8, filed on Jul. 10, 2019, the entire contents of which are incorporated herein by reference.

TECHNICAL FIELD

The present invention relates to the technical field of optical communication systems, and in particular to a reflection-type coherent optical communication system combined with unidirectional optical signal amplification.

BACKGROUND

A coherent optical communication system transmits information by modulating the frequency or phase of an optical carrier, and uses a homodyne or heterodyne method to detect the transmission signal. The coherent optical communication system employs different receiving methods, including a heterodyne receiving method and a homodyne receiving method. The homodyne detection sensitivity is high, and thus, the homodyne detection is widely used. Demodulation of an optical signal may adopt a synchronous or asynchronous scheme. Synchronous homodyne demodulation requires that the frequency of local oscillator light is exactly equal to the frequency of a modulation signal, and the phase of the local oscillator light is locked with the phase of the modulation signal. Therefore, an optical phase-locked loop (OPLL) is used in a receiver, so that the phase of the local oscillator always tracks the phase of the modulation signal. However, in practical applications, it is relatively difficult to achieve the OPLL with excellent performance.

At present, coherent optical communication systems generally use an optical-electrical combined asynchronous reception. An optical modulator is used to modulate a signal at a transmitting end. The modulated optical signal passes through a transmission optical fiber and enters a coherent receiver along with the local oscillator light at a receiving end to complete coherent detection processing.

SUMMARY

The technical problem to be solved by the present invention is the relatively poor security in the modulation process of the existing coherent optical communication system. To solve the above problem, the present invention provides a reflection-type coherent optical communication system combined with unidirectional optical signal amplification.

The present invention is realized by the following technical solution.

A reflection-type coherent optical communication system combined with unidirectional optical signal amplification, includes: a transmitting end, wherein the transmitting end includes a polarization controller, a polarization beam splitter, a polarization maintaining optical circulator, an optical modulator, a photoelectric converter, an electrical comparator, an In-line polarizer and an optical amplifier, a laser, a coupler, a reflection end and a coherent receiver, wherein the laser is disposed at a receiving end;

wherein a light source is disposed at the receiving end, the laser emits an optical carrier, the optical carrier is transmitted through the coupler and the optical fiber, and then, after the optical carrier and a modulation signal that are transmitted in opposite directions are separated through the optical amplifier, the polarization state of the optical carrier is controlled by two ways, the optical carrier passes through the polarization controller in a first way of the two ways, and two beams of light are output by the polarization beam splitter; the two beams of light with high-power enters a second port of the polarization maintaining optical circulator through a first branch, output from a third port of the polarization maintaining optical circulator and then enters the optical modulator, and a modulation signal output by the optical modulator is returned to a first port of the polarization maintaining optical circulator, then output from the second port of the polarization maintaining optical circulator and returned along an original optical path; light output from the polarization beam splitter passes through the photoelectric converter and the electrical comparator in sequence through a second branch to realize a feedback control of the polarization controller, in a second way of the two ways, the polarization state of the optical carrier is controlled by the In-line polarizer, and then modulated by the polarization maintaining optical circulator and returned along the original optical path, and in a return process, the modulation signal is amplified through the optical amplifier and returned to the receiving end; and light returned by a third port of the coupler as local oscillator light and the modulation signal reflected back from the reflection end enter the coherent receiver for coherent demodulation. If the optical fiber or a relay structure is disconnected, transmission of the optical carrier is terminated. That is, the signal cannot be stolen, and confidential communication can be realized.

Preferably, the optical amplifier comprises two circulators and an erbium-doped optical fiber amplifier (EDFA), the two circulators are the same and both are three-port circulators, the two circulators are recorded as a first circulator and a second circulator, the two three-port circulators are used to separate the optical carrier and the modulation signal that are transmitted in opposite directions, and the erbium-doped optical fiber amplifier is used to amplify the modulation signal reflected back. If the optical carrier and the modulation signal are amplified at the same time, due to Rayleigh backscattering of the optical carrier and modulation signal, noise will also be amplified, which will deteriorate the quality of signal transmission. Therefore, the use of this amplifier structure can avoid more noise caused by Rayleigh backscattering.

Specifically, the optical carrier passes through the coupler and then enters a second port of the first circulator, and is output from a third port of the first circulator and transmitted into a first port of the second circulator, then output from a second port of the second circulator; and a modulation signal reversed by the polarization controller and/or the In-line polarizer enters from the second port of the second circulator, and is output from a third port of the second circulator, amplified through the optical amplifier and then enters a first port of the first circulator, and then output and returned from the second port of the first circulator.

Preferably, the light source comprises carrier light and local oscillator light, and the carrier light and the local oscillator light are the same laser source, which realizes coherent reception at the same frequency, and ensures the confidentiality of signal transmission in combination with a single-fiber bidirectional transmission mode.

Preferably, the reflection-type coherent optical communication system further comprises a Digital Signal Processor (DSP) module, wherein the modulation signal after passing through the coherent receiver enters the DSP module, and is compensated for frequency offset and dispersion by the DSP module to complete demodulation.

Preferably, the optical modulator is a lithium niobate (LiNbO3) phase modulator. Due to its polarization sensitivity, the polarization controller is used to control the polarization state, and feedback control is used to improve the polarization control efficiency, which ensures the consistency and stability of the polarization state in a signal modulation process in combination with the polarization controller and the polarization maintaining optical circulator.

The present invention has the following advantages.

1. The reflection-type coherent optical communication system combined with unidirectional optical signal amplification proposed in the present invention strictly controls the polarization state, ensures the consistency and stability of the polarization state in the modulation process, realizes the modulation of the signal and reflects it back to the receiving end.

2. In the present invention, a special structure optical amplifier is adopted, two circulators are used to separate the carrier light from the modulation signal, and the modulation signal is amplified by the erbium-doped optical fiber amplifier (EDFA).

3. In the present invention, the carrier light and the local oscillator light are the same laser source, realizing coherent reception at the same frequency, and ensuring the confidentiality of signal transmission in combination with the single-fiber bidirectional transmission mode. Because the optical carrier and the modulation signal are transmitted in the same optical fiber, once the optical fiber or a relay structure is disconnected, the optical carrier cannot enter the modulation process. That is, the signal cannot be stolen, so that confidential communication is realized.

4. In the present invention, a feedback type polarization state control subsystem combined with a polarization controller, a polarization beam splitter, a photoelectric converter and an electrical comparator module is provided.

5. In the present invention, the polarization control process is simplified, and an In-line polarizer is used as another set of polarization control schemes. The structure is simple, but there is a certain degree of power consumption.

BRIEF DESCRIPTION OF THE DRAWINGS

The drawings described herein are used to provide a further understanding of the embodiments of the present invention, form a part of the present application, and do not constitute a limitation on the embodiments of the present invention. In the drawings.

REFERENCE SIGNS AND NAMES OF CORRESPONDING PARTS IN THE DRAWINGS

1—polarization controller, 2—polarization beam splitter, 3—polarization maintaining optical circulator, 4—optical modulator, 5—photoelectric converter, 6—electrical comparator, 7—optical amplifier, 8—laser, 9—coupler, 10—reflection end, 11—coherent receiver, 13—erbium-doped optical fiber amplifier, 14—DSP module, 15—In-line polarizer, 301—first port of polarization maintaining optical circulator 3, 302—second port of polarization maintaining optical circulator 3, 303—third port of polarization maintaining optical circulator 3, 901—first port of coupler 9, 902—second port of coupler 9, 903—third port of coupler 9, 904—fourth port of coupler 9, 121—first circulator, 1211—first port of first circulator 121, 1212—second port of first circulator 121, 1213—third port of first circulator 121, 122—second circulator, 1221—first port of second circulator 122, 1222—second port of second circulator 122, 1223—third port of second circulator 122.

DETAILED DESCRIPTION OF THE EMBODIMENTS

In order to make the purpose, technical solutions and advantages of the present invention clearer, the present invention will be further described in detail below in conjunction with the embodiments and drawings. The schematic embodiments of the present invention and the description thereof are only used to explain the present invention, and are not used as a limitation of the present invention.

Embodiment 1

Figure 1A:
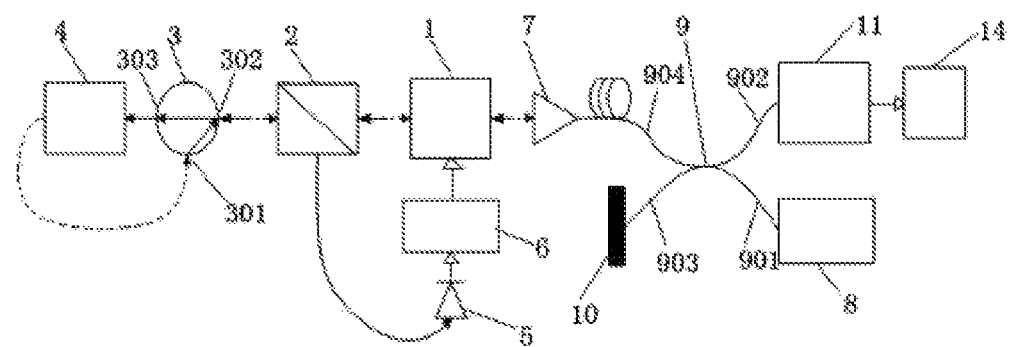
FIG. 1(a) and FIG. 1(b) are respectively a schematic structural view of a reflection-type coherent optical communication system combined with unidirectional optical signal amplification according to the present invention, which includes two different polarization control schemes.
Figure 1B:
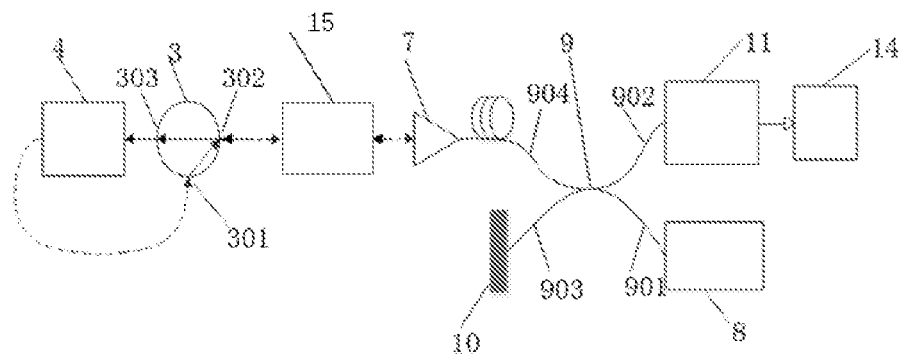
Figure 2:
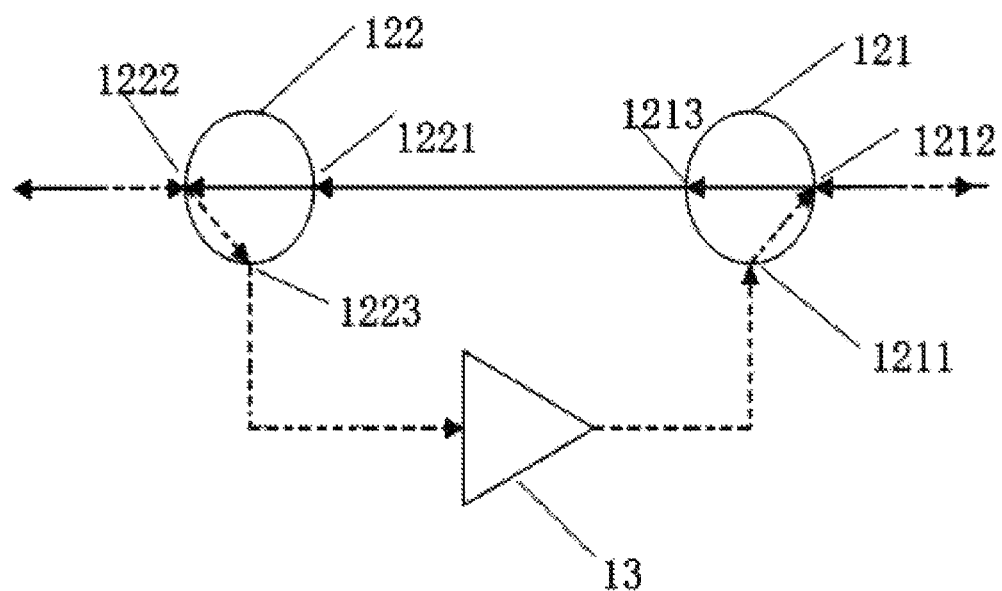
FIG. 2 is a schematic structural view of an optical amplifier for unidirectional optical signal amplification according to the present invention.

As shown in FIGS. 1(a), 1(b) and 2, a reflection-type coherent optical communication system combined with unidirectional optical signal amplification includes: a transmitting end, including the polarization controller 1, the polarization beam splitter 2, the polarization maintaining optical circulator 3, the optical modulator 4, the photoelectric converter 5, the electrical comparator 6, an In-line polarizer 15 and the optical amplifier 7, the laser 8, the coupler 9, the reflection end 10 and the coherent receiver 11. The laser 8 is disposed at a receiving end. The third port 303 of the polarization maintaining optical circulator 3 is isolated from the first port 301 thereof.

A light source is disposed at the receiving end. The laser 8 emits an optical carrier, and the optical carrier is separately output from the third port 903 and the fourth port 904 of the coupler 9 via the first port 901 of the coupler 9. The optical carrier output from the fourth port 904 of the coupler 9 is transmitted into the optical amplifier 7 through an optical fiber. After the optical carrier and a modulation signal that are transmitted in opposite directions are separated through the optical amplifier 7, the polarization state of the optical carrier is controlled by two ways, the optical carrier passes through the polarization controller 1 in a first way of the two ways, and two beams of light are output by the polarization beam splitter 2. A beam of light of the two beams of light with high-power enters the second port 302 of the polarization maintaining optical circulator 3 through a first branch, is output from the third port 303 of the polarization maintaining optical circulator 3 and then enters the optical modulator 4. The modulation signal output by the optical modulator 4 is returned to the first port 301 of the polarization maintaining optical circulator 3, and then output from the second port 302 of the polarization maintaining optical circulator 3 and returned along an original optical path. The light output from the polarization beam splitter 2 passes through the photoelectric converter 5 and the electrical comparator 6 in sequence through a second branch to realize feedback control of the polarization controller, in a second way of the two ways, the polarization state of the optical carrier is controlled by the In-line polarizer 15, and then modulated by the polarization maintaining optical circulator 3 and returned along the original optical path, and in a return process, the modulation signal is amplified through the optical amplifier 7 and returned to the receiving end, thus improving the polarization control efficiency of the polarization controller. The light returned by the third port 903 of the coupler 9 as local oscillator light and the modulation signal reflected back from the reflection end 10 are output from the second port 902 of the coupler 9 and enter the coherent receiver 11 for coherent demodulation. If the optical fiber or a relay structure is disconnected, the transmission of the optical carrier is terminated. That is, the signal cannot be stolen, and confidential communication can be realized.

The light source includes carrier light and local oscillator light, and the carrier light and the local oscillator light are the same laser source, ensuring the confidentiality of signal transmission in combination with the single-fiber bidirectional transmission mode.

The optical modulator 4 is a lithium niobate phase modulator. Due to its polarization sensitivity, the polarization controller is used to control the polarization state, and feedback control is used to improve the polarization control efficiency, ensuring the consistency and stability of the polarization state in the signal modulation process in combination with the polarization controller and the polarization maintaining optical circulator.

FIG. 1(a) and FIG. 1(b) are respectively a schematic structural view of a reflection-type coherent optical communication system combined with unidirectional optical signal amplification, which includes two different polarization control schemes. FIG. 2 is a schematic structural view of an optical amplifier for unidirectional optical signal amplification according to the present invention. The solid line with the solid arrow is a forward light wave transmission path, the dotted line with the solid arrow is a reverse light wave transmission path, and the solid line with the hollow arrow is an electrical signal line.

As shown in FIG. 2, the optical amplifier 7 includes two circulators and the erbium-doped optical fiber amplifier 13. The two circulators are the same and both are three-port circulators. The two circulators are recorded as the first circulator 121 and the second circulator 122. The two three-port circulators are used to separate the optical carrier and the modulation signal that are transmitted in opposite directions. The erbium-doped optical fiber amplifier 13 is used to amplify the modulation signal reflected back. If the optical carrier and the modulation signal are amplified at the same time, due to Rayleigh backscattering of the optical carrier and modulation signal, noise will also be amplified, which will deteriorate the quality of signal transmission. Therefore, the use of the amplifier structure can avoid introducing more noise caused by Rayleigh backscattering.

Specifically, the optical carrier passes through the coupler 9 and then enters the second port 1212 of the first circulator 121, is output from the third port 1213 of the first circulator 121 and transmitted into the first port 1221 of the second circulator 122, and then output from the second port 1222 of the second circulator 122.

The modulation signal reversed by the polarization controller 1 and/or the In-line polarizer 15 enters from the second port 1222 of the second circulator 122, is output from the third port 1223 of the second circulator 122, amplified through the optical amplifier 7 and then enters the first port 1211 of the first circulator 121, and then is output and returned from the second port 1212 of the first circulator 121.

Embodiment 2

As shown in FIGS. 1(a), 1(b) and 2, the reflection-type coherent optical communication system further includes the DSP module 14 compared to Embodiment 1. The modulation signal after passing through the coherent receiver 11 enters the DSP module 14, and is compensated for frequency offset and dispersion by the DSP module 14 to complete demodulation.

The DSP module 14 is a digital signal processing module, specifically including a series of digital coherence algorithms of dispersion compensation, clock recovery, polarization mode dispersion compensation, carrier recovery and phase compensation. After a signal is detected and processed by the coherent receiver, it is processed by the DSP module 14 to perform the judgment and decoding of the signal. Finally, the demodulation of the signal is completed.

The specific embodiments described above further describe the objectives, technical solutions, and advantages of the present invention in detail. It should be understood that the above described are only specific embodiments of the present invention, and not intended to define the scope of protection of the present invention. Any modifications, equivalent replacements, improvements, etc. made within the spirit and principle of the present invention shall be included in the scope of protection of the present invention.

What is claimed is:

1. A reflection-type coherent optical communication system combined with unidirectional optical signal amplification, comprising a transmitting end, wherein
the transmitting end comprises (i) a polarization controller, a polarization beam splitter, a polarization maintaining optical circulator, an optical modulator, a photoelectric converter, an electrical comparator, and an optical amplifier, a laser, a coupler, a reflection end and a coherent receiver, or (ii) a polarization maintaining optical circulator, an optical modulator, an In-line polarizer and an optical amplifier, a laser, a coupler, a reflection end and a coherent receiver, wherein
the laser is disposed at a receiving end, a light source is disposed at the receiving end, the laser emits an optical carrier, the optical carrier is transmitted through the coupler and the optical fiber, and then, after the optical carrier and a modulation signal transmitted in opposite directions are separated through the optical amplifier, the polarization state of the optical carrier is controlled by two ways, the optical carrier passes through the polarization controller in a first way of the two ways, and two beams of light are output by the polarization beam splitter;
a beam of light of the two beams of light with high-power enters a second port of the polarization maintaining optical circulator through a first branch, output from a third port of the polarization maintaining optical circulator and then enters the optical modulator, and the modulation signal output by the optical modulator is returned to a first port of the polarization maintaining optical circulator, then output from the second port of the polarization maintaining optical circulator and returned along an original optical path;
light output from the polarization beam splitter passes through the photoelectric converter and the electrical comparator in sequence through a second branch to realize a feedback control of the polarization controller, alternatively, in a second way of the two ways, the polarization state of the optical carrier is controlled by the In-line polarizer, and then modulated by the polarization maintaining optical circulator and returned along the original optical path, and in a return process, the modulation signal is amplified through the optical amplifier and returned to the receiving end; and light returned by a third port of the coupler as local oscillator light and the modulation signal reflected back from the reflection end enter the coherent receiver for coherent demodulation.

2. The reflection-type coherent optical communication system combined with the unidirectional optical signal amplification according to claim 1, wherein, the optical amplifier comprises two circulators and an erbium-doped optical fiber amplifier, the two circulators are the same and both are three-port circulators, the two circulators are recorded as a first circulator and a second circulator, the two three-port circulators are configured to separate the optical carrier and the modulation signal transmitted in opposite directions, and the erbium-doped optical fiber amplifier is configured to amplify the modulation signal reflected back;

the optical carrier passes through the coupler and then enters a second port of the first circulator, output from a third port of the first circulator and transmitted into a first port of the second circulator, and then output from a second port of the second circulator; and the modulation signal reversed by the polarization controller and/or the In-line polarizer enters from the second port of the second circulator, is output from a third port of the second circulator, is amplified through the optical amplifier and then enters a first port of the first circulator, and then is output and returned from the second port of the first circulator.

3. The reflection-type coherent optical communication system combined with the unidirectional optical signal amplification according to claim 1, wherein, the light source comprises carrier light and local oscillator light, and the carrier light and the local oscillator light are the same laser source.

4. The reflection-type coherent optical communication system combined with the unidirectional optical signal amplification according to claim 1, further comprising a DSP module, wherein the modulation signal after passing through the coherent receiver enters the DSP module, and is compensated for frequency offset and dispersion by the DSP module to complete demodulation.

5. The reflection-type coherent optical communication system combined with the unidirectional optical signal amplification according to claim 1, wherein, the optical modulator is a lithium niobate phase modulator.

* * * * *